(12) United States Patent
Nanba

(10) Patent No.: US 6,584,066 B2
(45) Date of Patent: Jun. 24, 2003

(54) OPTICAL STORAGE MEDIUM IN WHICH SECTOR ADDRESS INFORMATION IS RECORDED USING MSR TECHNIQUES

(75) Inventor: Yoshiyuki Nanba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 264 days.

(21) Appl. No.: 09/730,821

(22) Filed: Dec. 6, 2000

(65) Prior Publication Data

US 2002/0159340 A1 Oct. 31, 2002

(30) Foreign Application Priority Data

Dec. 7, 1999 (JP) .......................................... 11-347829

(51) Int. Cl.⁷ ................................................ G11B 7/24
(52) U.S. Cl. .................................. 369/275.3; 369/13.35
(58) Field of Search .......................... 369/275.3, 275.4, 369/275.2, 13.35, 13.55, 53.2, 53.44; 478/64.1, 64.3, 64.4

(56) References Cited

U.S. PATENT DOCUMENTS

| | | | | |
|---|---|---|---|---|
| 5,422,874 A | * | 6/1995 | Birukawa et al. | 369/275.2 |
| 5,740,154 A | * | 4/1998 | Izumi et al. | 369/275.3 |
| 6,069,870 A | * | 5/2000 | Maeda et al. | 369/275.3 |
| 6,072,754 A | * | 6/2000 | Izumi | 369/275.3 |
| 6,449,231 B1 | * | 9/2002 | Numata | 369/275.3 |

FOREIGN PATENT DOCUMENTS

| | | |
|---|---|---|
| EP | 0 880 129 | 11/1996 |
| JP | 08-339540 | 12/1996 |
| JP | 10-112029 | 4/1998 |
| WO | WO97/29483 | 8/1997 |

* cited by examiner

*Primary Examiner*—Tan Dinh
(74) *Attorney, Agent, or Firm*—Greer, Burns & Crain, Ltd.

(57) ABSTRACT

A storage medium stores information on a plurality of tracks formed thereon, each of the tracks being divided into a plurality of sectors. The storage medium includes a physically formed sector beginning identifier provided at a leading portion of each sector, and an information storing portion. The information storing portion, another sector address portion at the trailing end of the information storing portion, includes at least one sector address portion at a leading end of the information storing portion, another sector address portion at the trailing end of the information storing portion, and a data portion provided between the two sector address portions.

5 Claims, 9 Drawing Sheets

Fig. 1A
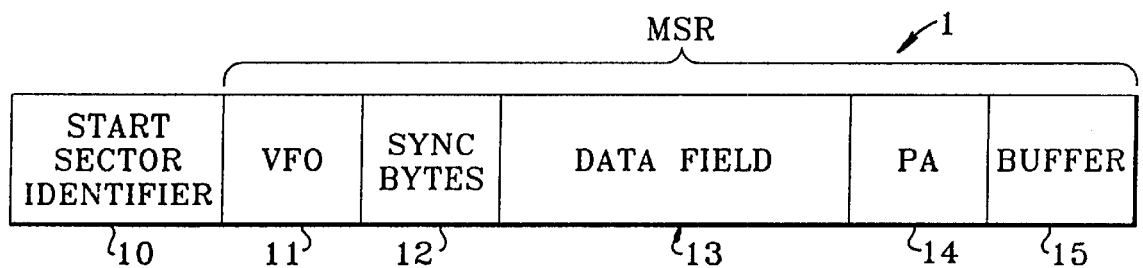
Fig. 1B
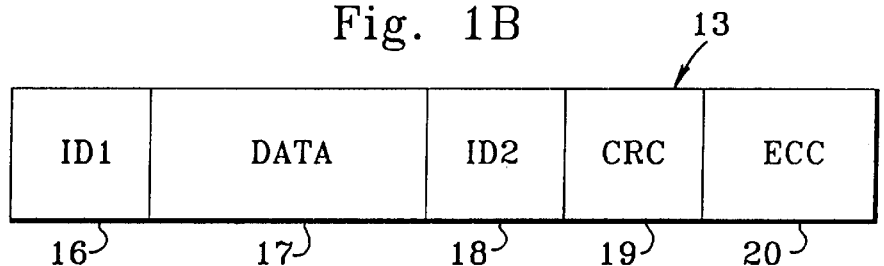
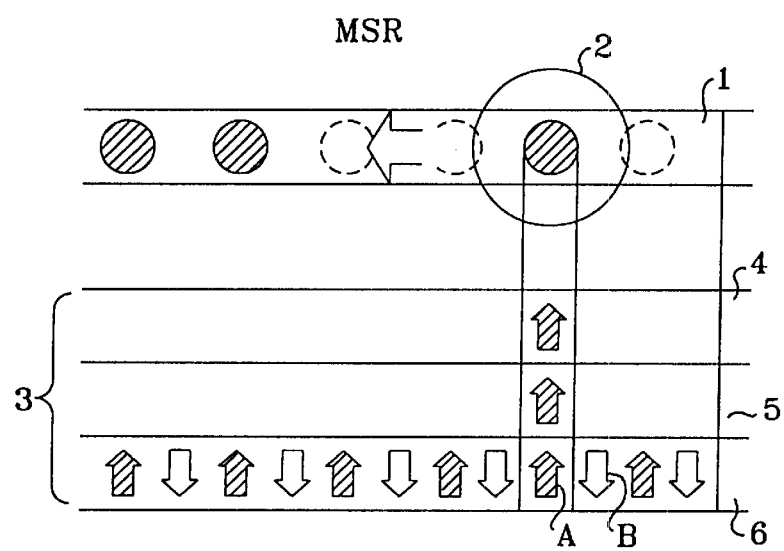
Fig. 2

OPTICAL STORAGE MEDIUM IN WHICH SECTOR ADDRESS INFORMATION IS RECORDED USING MSR TECHNIQUES

FIELD OF THE INVENTION

The present invention relates to improvements to a storage medium which increase the storage capacity of the medium. More particularly, the present invention relates to a storage medium in which sector address information is recorded using MSR techniques.

BACKGROUND OF THE INVENTION

Optical disks are widely used as external storage media for computers. Magneto-optical disks have become popular because they are rewritable and provide a relatively high recording density. In the past, 3.5 inch magneto-optical disks were only capable of storing 128 MB of information. Recent advances, however, have enhanced the storage capacity of 3.5 inch magneto-optical disks to 1.3 GB, and even greater increases in storage capacity are presently being sought.

Magneto-optical disks include at least one recording layer formed on a substrate. Information is recorded/reproduced from magneto-optical disks using a laser light source and a magnetic source. Typically, grooves (tracking guide grooves) are formed in spiral fashion on the substrate of the medium. Data is recorded on tracks provided on lands between these grooves.

In the past, the recording density of magneto-optical disks has been limited by the diameter of the beam spot of the laser beam. However, in recent years, magneto-optical super resolution technology known as MSR (Magnetically Induced Super Resolution) has facilitated the recording and retrieving of a mark smaller than the diameter of a laser beam. For example, with a 3.5 inch magneto-optical disk, recording and retrieving of a mark smaller than the laser beam spot with track pitch of 0.90 µm and a mark length of 0.38 µm is now possible. Consequently, a ten fold increase in storage capacity to 1.3 GB has been realized.

Magneto-optical disks record and retrieve in a storage unit termed a sector. By manner of illustration, FIGS. 12A and 12B show a traditional MSR magneto-optical disk sector format in which sector address information portion 90 is physically formed as an indented (embossed) pit with a stamper in the same manner as a tracking groove. Sector address information 90 includes a sector mark SM which indicates the beginning of a sector, PLL phase lead-in term signal VFO1, address mark AM indicating the beginning of the first sector ID, first sector address ID1, PLL phase lead-in term signal VFO2, address mark AM indicating the beginning of the second sector, second sector address ID2 and post amble PA indicating the end of the sector address information portion.

Sector address information stored in ID1 and ID2 includes track number and sector number information. The second sector address ID2 stores the same information as the first sector address, and is included as a backup in case ID1 becomes unreadable.

A gap 91 separates the sector address information portion 90 from VFO area 92 in which a VFO pattern for adjusting the frequency is recorded. Sync byte area 93 is interposed between a data area 94, and the aforementioned VFO area 92. A post amble (PA) 95 and buffer 96 for a buffering area are formed subsequent the data area 94.

Data is recorded at a high density in the data area 94 portion using MSR techniques. In contrast, sector address information portion 90 is recorded at a significantly lower density than the data recorded in the data portion 94, since it is physically formed by embossing or the like.

Accordingly, one problem associated with conventional magneto-optical storage mediums relates to the relatively large area required to store sector address information, and the ensuant decrease in usable storage capacity of the medium.

OBJECTS

One object of the present invention is to increase the usable storage capacity of a magneto-optical storage medium by reducing the area required to store sector address information.

Another object of the invention is provide a storage medium including an error correction code for correcting a sector address.

Another object of the invention is to provide an improved method for determining whether a head is in an off track condition during a read operation.

Yet another object of the invention is to provide an improved method for verifying that a write operation has written to the correct sector, where the target sector is not read prior to the writing operation.

SUMMARY

Briefly, the present invention relates to an improved storage medium for storing information. Information is stored on a plurality of tracks formed on the storage medium, each of the tracks being divided into a plurality of sectors. Each sector includes a physically formed sector beginning identifier provided at a leading portion of the sector, and an information storing portion. At least one sector address portion for storing a sector address is provided at a leading end of the information storing portion, and a data portion for storing user data is provided after the sector address portion.

These and other aspects of the invention will be more fully understood by referring to the following detailed description and the accompanying drawings.

BRIEF DESCRIPTION OF THE DRAWINGS

FIGS. 1A and 1B are block diagrams of a first embodiment of a sector format of the present invention;

FIG. 2 is a drawing illustrating the principles of MSR recording and retrieving techniques used to record information on a magneto-optical disk of the present invention;

DETAILED DESCRIPTION

Figure 3A:
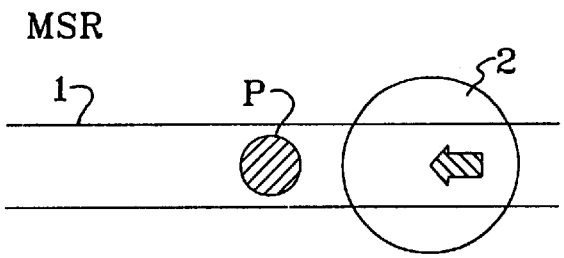
FIGS. 3(A)–(3(E) illustrate steps in retrieving MSR information.

A first embodiment of the present invention will be explained with reference to FIGS. 1–3, in which FIGS. 1A and 1B are block diagrams of a sector format, and FIGS. 2 and 3 show principles of MSR recording and retrieving.

As FIG. 1A shows, a sector 1 according to the present invention which includes, in the order specified, a sector start identifier 10, a PLL lead-in signal (VFO) 11, sync bytes 12, a data field 13, a post-amble (PA) 14, and a buffer 15.

The sector start identifier 10 is a sector mark which indicates the beginning of a sector, and is a physically formed indented pit. The pLL lead-in signal (VFO) 11, the sync bytes 12, the data field 13, the post-amble (PA) 14 and the buffer 15 are formed using MSR recording techniques which will be discussed later. The buffer 15 is a buffering area provided for absorbing rotational jitter of a spindle motor.

The data field 13 includes a sector track number (not specifically shown), a first sector address (ID1) 16 which contains a sector number, a 2048 byte data area 17, a second sector address (ID2) 18 which contains the same information as the first sector address (ID1), a CRC (Cyclic Redundancy Check) byte 19, and an ECC (Error Correction Code) byte 20.

The sector addresses (ID1) 16 and (ID2) 18 each contain four bytes. The CRC byte 19 is created by a commonly known method using the first sector address 16, the data of 2048 byte data area 17 and the second sector address 18. Also, the ECC byte 20 is created with a commonly known method using the first sector address 16, the data of 2048 byte data area 17, the second sector address 18 and the CRC byte 19.

According to one aspect of the present invention, the sector addresses 16 and 18 are recorded using MSR techniques having a significantly higher recording density than the density of the physically formed sector start identifier 10. Consequently, there is a reduction in the amount of physically formed sector address information. As a result, the overall storage capacity increases because more area is available to record user data. In fact, sector address information according to the present embodiment requires only 55 bytes, which is half of what is required in conventional storage media. In this manner, the present embodiment facilitates a 3% increase in storage capacity over conventional storage mediums using 110 bytes of physically formed sector address information.

Figure 12A:
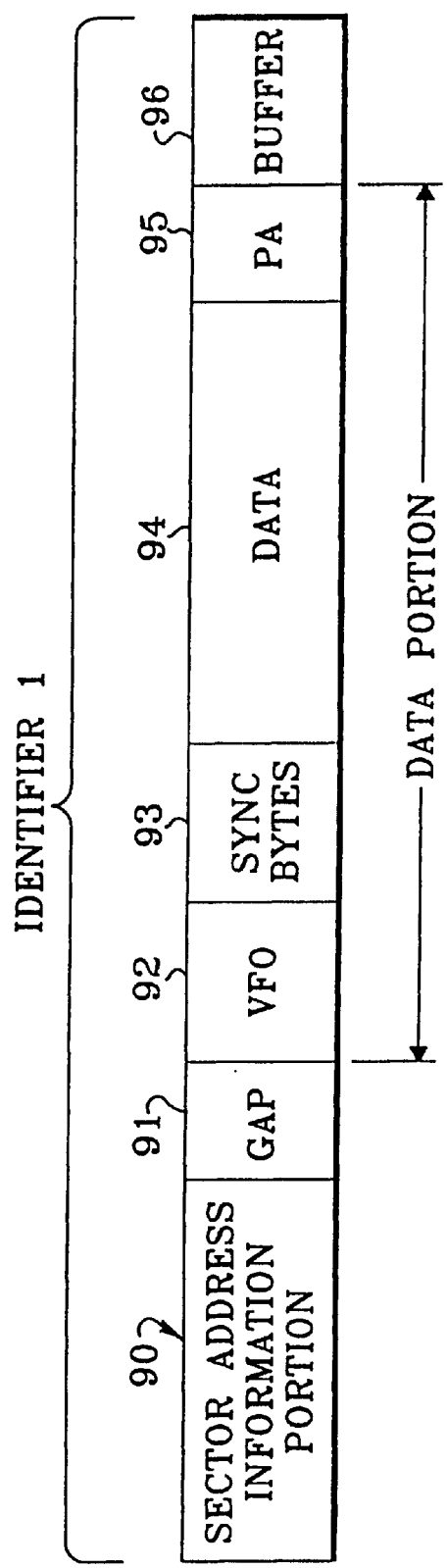
FIGS. 12A and 12B are block diagrams of a conventional sector format.
Figure 12B:
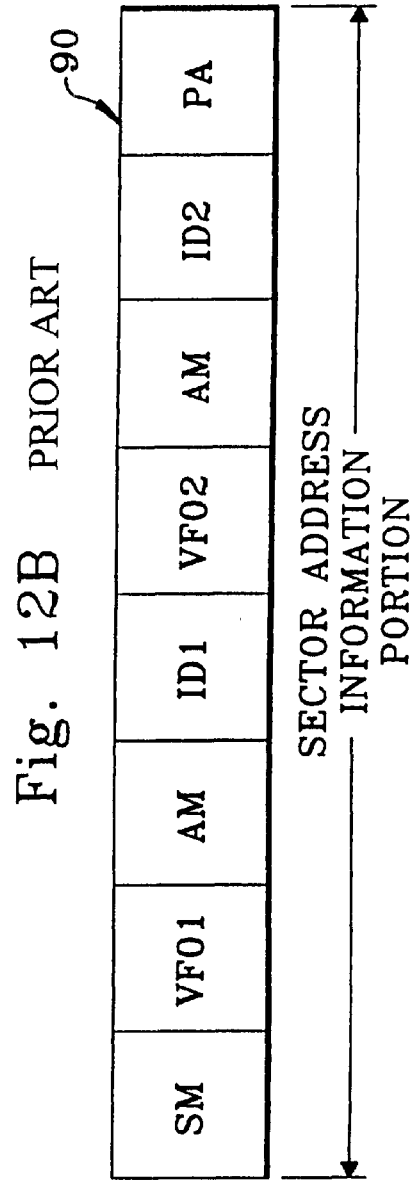

Moreover, the use of MSR techniques to record the sector addresses 16 and 18 eliminates the need to provide the VFO1, AM, VFO2 and AM pits of sector address information 90 (FIG. 12) provided in conventional devices. Accordingly, storage capacity in a device according to the present invention is further increased.

As noted above, sector start identifier 10 is formed as a physically indented pit. The use of a physically formed pit is desirable in order to assure detection of the beginning of a sector.

With the improved sector formatting of the present invention, the sector addresses ID1 16 and ID2 18 are recorded in the data field 13 using MSR techniques. As is well known in the art, misreading of the sector address may be determined using the CRC byte. Thus, if necessary, the misread sector address may be corrected using the ECC byte 20. Consequently, accurate reading of sector addresses in a device according to the present invention is assured.

Still further, the detection of an off tracking error in the center portion of a sector is facilitated in the present invention using the sector addresses 16 and 18 provided on either side of the data area 17. Specifically, an off tracking error is signaled if the sector address 16 which proceeds the data portion 17 does not match the sector address 18 which immediately follows the data portion 17.

MSR recording and retrieving according to the present invention will be explained with reference to FIGS. 2 and 3. As shown in FIG. 2, a magneto-optical disk according to the present invention is provided with a magnetic recording layer 3 which includes a recording layer 6, an intermediate layer 5 and a retrieving layer 4.

The intermediate layer 5 has a property whereby it selectively passes signals recorded on the recording layer 6 to the retrieving layer 4. Specifically, the intermediate layer 5 passes signals to the retrieving layer 4 only when heated to a predetermined constant temperature, e.g., 200° C. These signals are reproduced from the retrieving area while a read/record magnetic field having orientation A (FIG. 2) is applied. By carefully controlling the laser light source, only a small portion of the beam spot reaches the predetermined constant temperature. In this manner, it is possible to assuredly record and reproduce bytes recorded in an area smaller than the beam spot. The specific layer type for preferred Double Mask RAD technology but other types of the MSR technologies can be used.

Figure 3B:
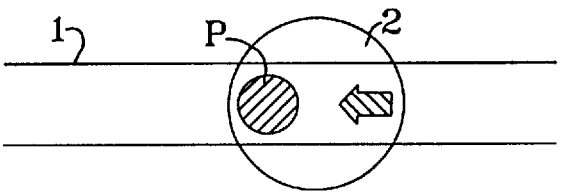
Figure 3C:
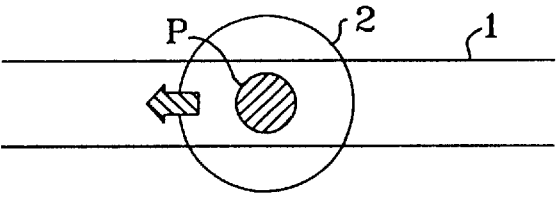

FIGS. 3A through 3E illustrate principles of reproducing information using MSR techniques. In FIG. 3A a beam spot 2 does not encompass a portion P of the magnetic recording layer 3. Accordingly, the portion P of the intermediate layer 5 will not pass any signals to the retrieving layer 4 because it is below the predetermined constant temperature. In FIG. 3B, the beam spot 2 has advanced and begins to heat portion P of the magnetic recording layer 3. However, the intermediate layer 5 will not pass signals to the retrieving layer 4 because it is still below the predetermined constant temperature. In FIG. 3C, the beam spot 2 has advanced slightly and has heated portion P to the predetermined constant temperature. Consequently, the intermediate layer 5 will pass signals recorded in portion P to the retrieving layer 4. This selective passing phenomenon is called a switched connection.

Figure 3D:
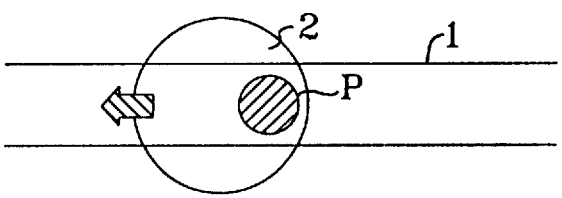
Figure 3E:
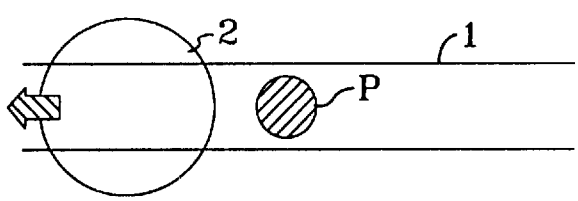

When the beam spot 2 advances as shown in FIG. 3D, the portion P of the intermediate layer 5 exceeds the predetermined constant temperature and ceases to pass (imprint/copy) signals to the retrieving layer 4. Subsequently, as shown in FIG. 3E, the beam spot 2 passes the portion P, thereby allowing that portion to cool. In this manner, a mark which is less than the diameter of the beam spot of a light beam can be reproduced.

Recording of data using MSR techniques is a two step process involving a preliminary step of orienting a direction of the magnetic area of the recording layer 6 in a predetermined direction, and a final step of recording information. The orienting step involves scanning a portion of the magnetic area of the recording layer 6 with a beam spot 2 having an erasing intensity while applying a magnetic field oriented in an erase direction. As shown in FIG. 2, the ERASE magnetic field B is oriented in an opposite direction from the READ/RECORD magnetic field A. Moreover, the erasing intensity of the beam spot 2 is higher than the read intensity of the beam spot.

Recording of information is accomplished by applying a magnetic field oriented in a read/record direction while irradiating a light beam of a write intensity. The magnetic orientation of the byte heated to the predetermined temperatures changes from an initial erase orientation to the orientation specified by the READ/RECORD magnetic field A.

Figure 4:
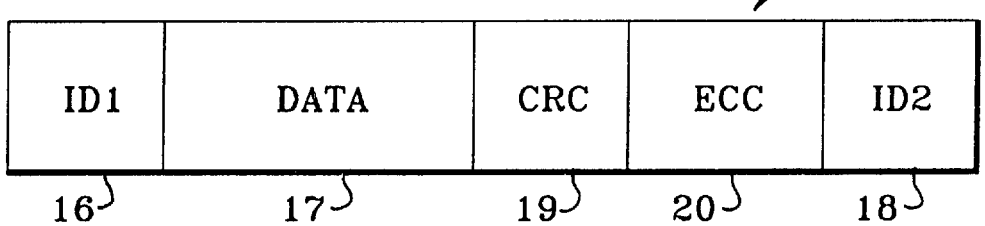
FIG. 4 is a block diagram of a variation of the sector format of FIG. 1.

FIG. 4 is a block diagram of a variation on the sector format shown in FIGS. 1A and 1B. Notably, the position of the second sector address (ID2) 18 is shifted to follow the ECC byte 20. As described above, off tracking of the head after the first sector address (ID1) 16 has been read is accomplished by comparing the first sector address (ID1) 16 with the second sector address (ID2) 18. According to the second embodiment, the ability to detect off tracking of the head is enhanced to include off tracking during reproduction of the CRC 19 and the ECC 20.

Figure 5:
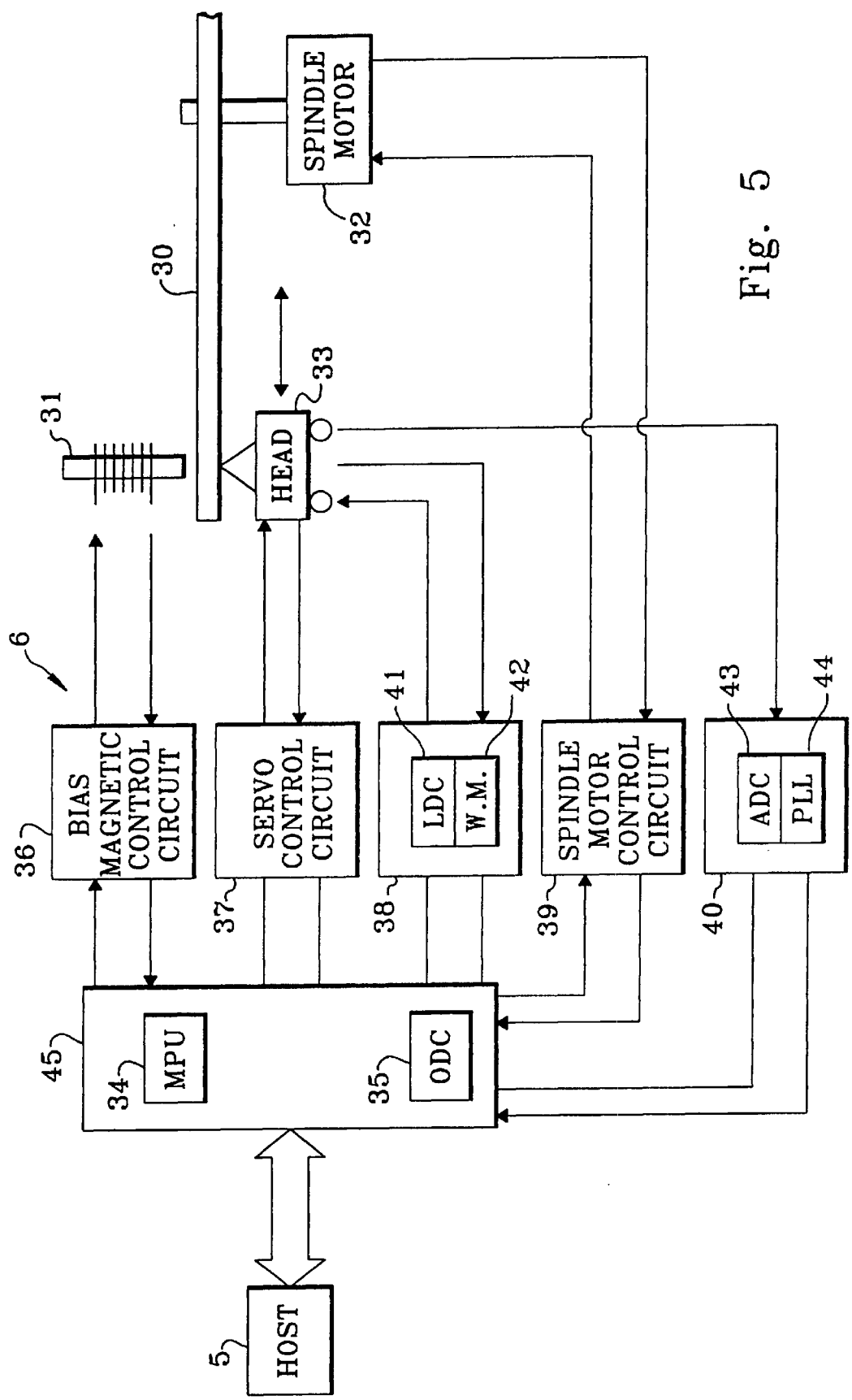
FIGS. 5 and 6 are block diagrams of an optical disk device used to record/retrieve information to/from an optical disk embodying the sector format of the present invention.
Figure 6:
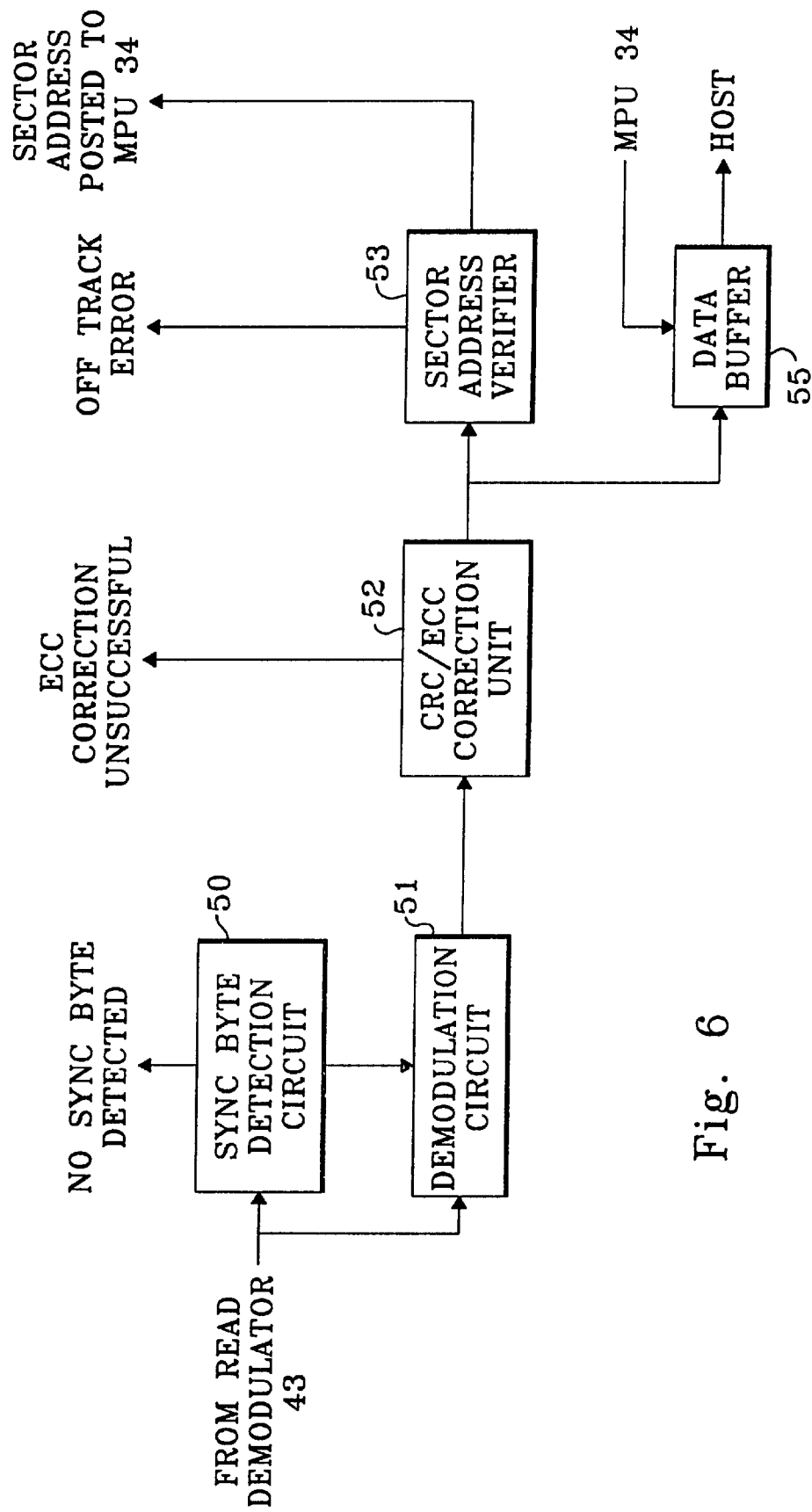

FIG. 5 is a block diagram of an optical disk device according to the present invention and FIG. 6 is a circuit diagram of the optical disk device of FIG. 5. A magneto-optical disk device 7 is connected to a host 9 as is shown in FIG. 5. A controller 45 includes an interface (not shown in the drawing) which exchanges commands and data with the host 9, a microprocessor (MPU) 34 and an optical disk controller (ODC) 35. The MPU 34 performs over-all control of the magneto-optical disk device, and the ODC 35 will be explained later with FIG. 6.

A bias magnet 31 applies a magnetic field to a magneto-optical disk 30. A bias magnet control circuit 36 controls the magnetic field of the bias magnet 31 in response to instructions from the MPU 34.

A WRITE (recording) circuit 38 includes a WRITE modulator 42 and a laser diode control circuit 41. The WRITE modulator 42 modulates WRITE data from the ODC 35 into data formatted in pit position modulation (PPM) record data (also called mark record) or into pulse width modulation (PWM) record data (also called edge record) corresponding to the type of magneto-optical disk. The laser diode control circuit 41 controls a laser beam intensity of an optical head 33 with this modulated data.

A READ (retrieve) circuit 40, is equipped with an AGC (automatic gain control) circuit, a filter, a sector mark detection circuit, an analog/digital conversion circuit (ADC), a READ demodulator 43, and a frequency synthesizer 44. The frequency synthesizer 44 generates a READ clock signal. The READ demodulator 43 detects the sector mark from the pit signal or from MO signal input from the optical head 33, and outputs a detection signal SM to the ODC 35. The READ demodulator 43 also converts the MO signal input from the optical head 33 into a digital value and outputs it to the ODC 35.

The optical head 33 detects the feedback light of the magneto-optical disk 30, and inputs an ID signal/MO signal to the READ circuit 40. A spindle motor 32 rotationally drives the magneto-optical disk 30, and a spindle motor control circuit 39 controls the spindle motor 32 in response to directives of the MPU 34.

A servo control circuit 37 has a TES detection circuit, a FES detection circuit, and a DSP (digital signal processor). The TES detection circuit creates a TES signal (tracking error signal) from light detected by the optical head 33. Correspondingly, a FES detection circuit creates a FES signal (focus error signal) from light detected by the optical head 33. The DSP drives a track actuator of the optical head 33 using the TES signal with a track servo loop, and drives a focus actuator of optical head 33 from the FES signal with a focus servo loop. Moreover, the DSP also drives and controls a VCM (which is not depicted in the drawing) which moves the optical head 33 in a direction crossing tracks of the magneto-optical disk 30.

Turning now to FIG. 6, the ODC 35 is provided with a sync byte detection circuit 50, a demodulation circuit 51, a CRC check/ECC correction circuit 52, a sector address verifier 53, and a data buffer 55. The MO signal digitized from READ circuit 43 is input to the sync byte detection circuit 50 and the demodulation circuit 51.

A read process is performed by transmitting a data start signal to the demodulation circuit 51 when the sync byte detection circuit 50 detects sync bytes 12 (FIG. 1). Thereafter, the demodulation circuit 51 begins demodulation. However, if the sync byte 12 is not detected within a predetermined time interval, a sync byte undetected error is reported to the MPU 34 from sync byte detection circuit 50.

Data demodulated by demodulation circuit 51 is sent to the CRC check/ECC correction circuit 52. The CRC check/ECC correction circuit 52 calculates CRC bytes from the demodulated data, and compares the calculated CRC bytes with the CRC bytes 19 of the demodulated data. If they do not match, error correction is performed by the ECC byte 20 in the ECC correction circuit 52 to correct the data. If ECC correction is unsuccessful, an ECC correction error is sent to the MPU 34. In this manner, an optical disk device 7 according to the present invention can assuredly obtain valid sector addresses even if the sector addresses are written using MSR techniques.

Restored data (or correct data which does not require correction) is sent to the sector address verifier 53 and the data buffer 55. The sector address verifier 53 extracts the first sector address 16 and the second address 18 of a sector and compares them. If these two addresses match, it can be confirmed that the head was not off track while writing, and the confirmed sector address is posted to the MPU 34. Conversely, an off tracking error is reported to the MPU 34 when the two sector addresses 16 and 18 do not match.

The above-described aspects of the present invention are not limited to magneto-optical disks, and may also be applied to other types of optical disks such as magnetic expansion retrieving type disks and magnetic field modulation type disks. In other words, the above-described aspects are applicable to other optical disks which record sector addresses with the same recording method as data. Furthermore, because it is contemplated that the present invention can be implemented for both a hard disk that magnetically controls the tracking and/or a hard disk drive that controls tracking with a laser unit, other implementations are within the scope of the present invention.

Figure 7:
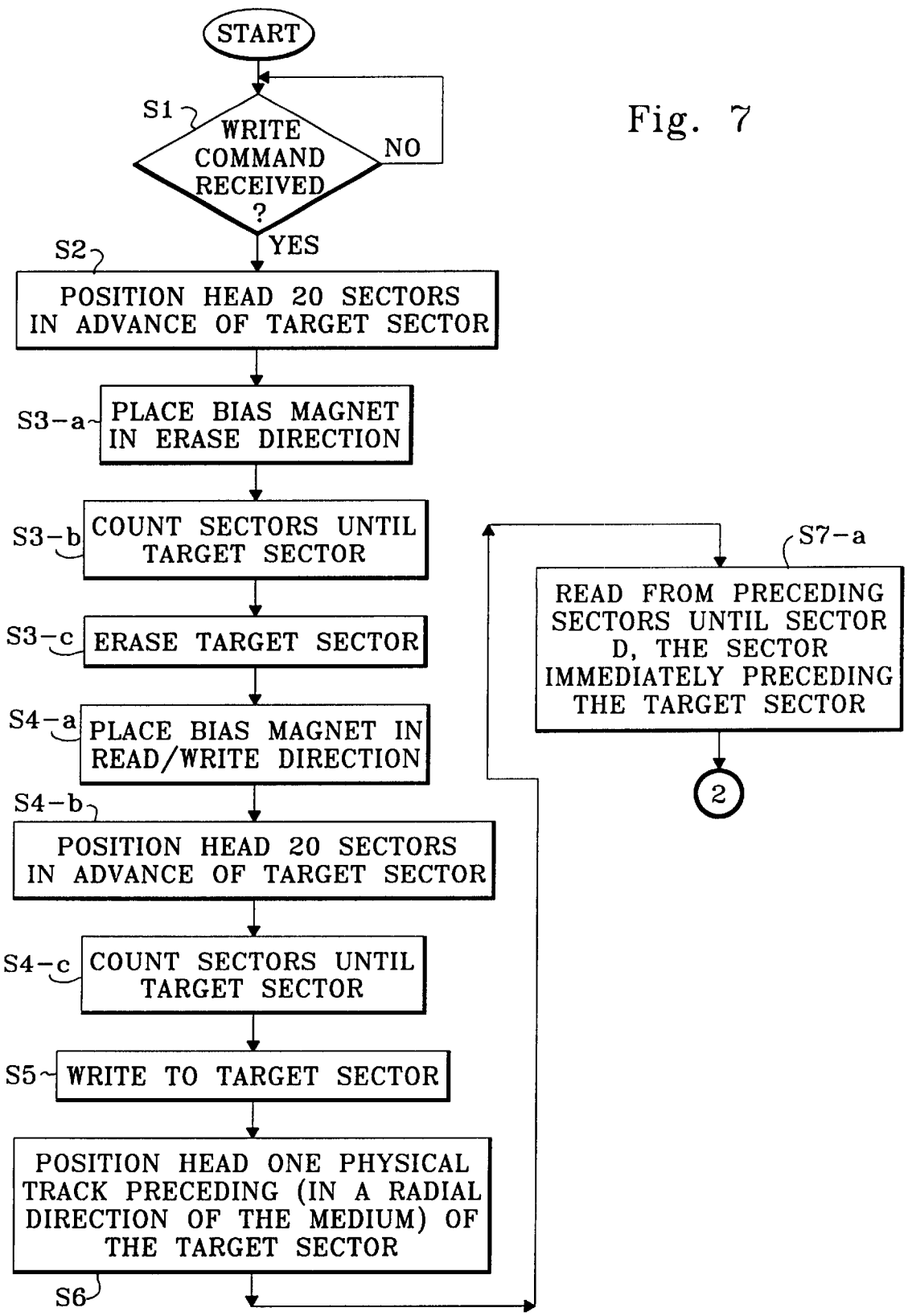
FIGS. 7 and 8 are flow diagrams showing steps for writing data on a target sector.
Figure 8:
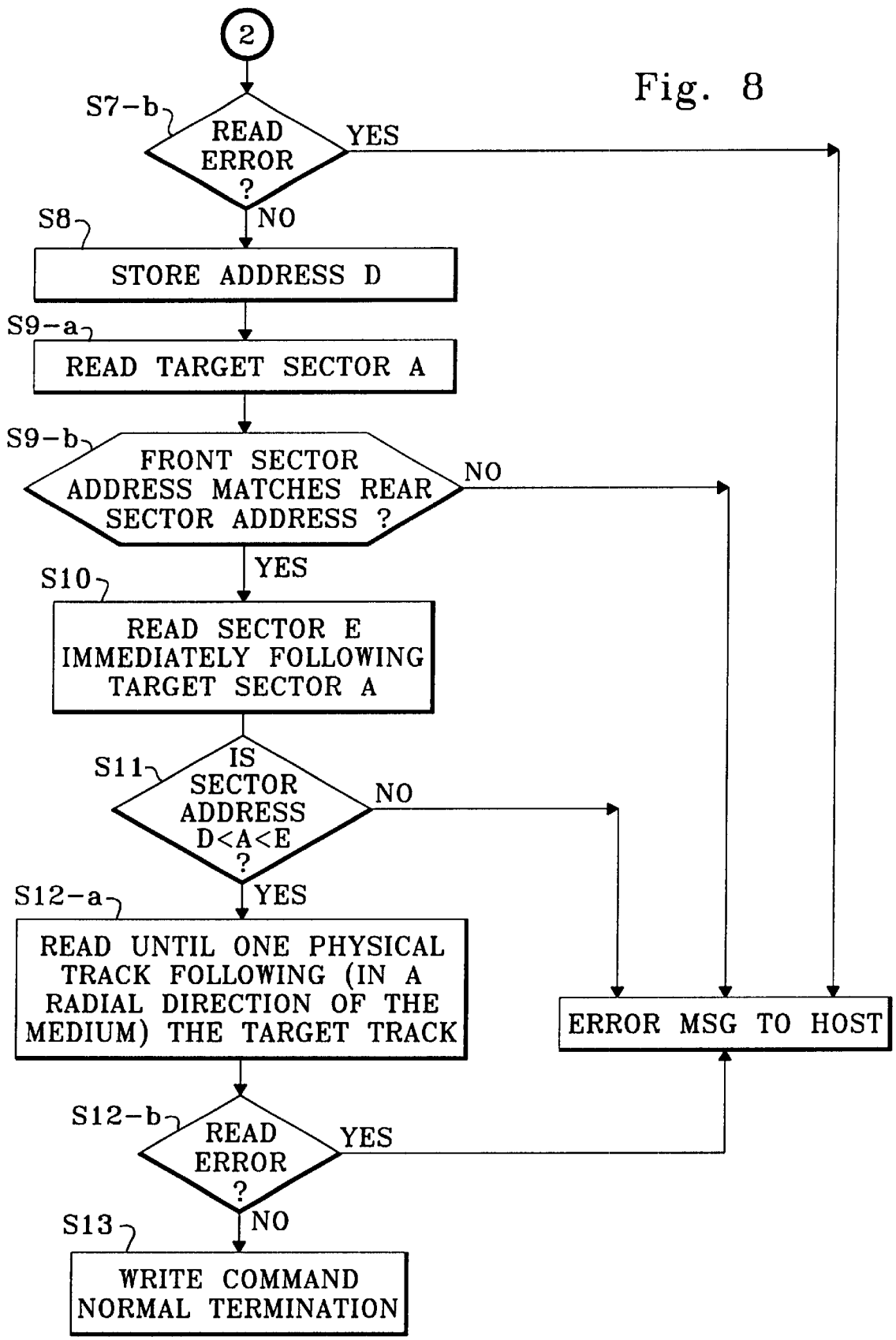
Figure 9:
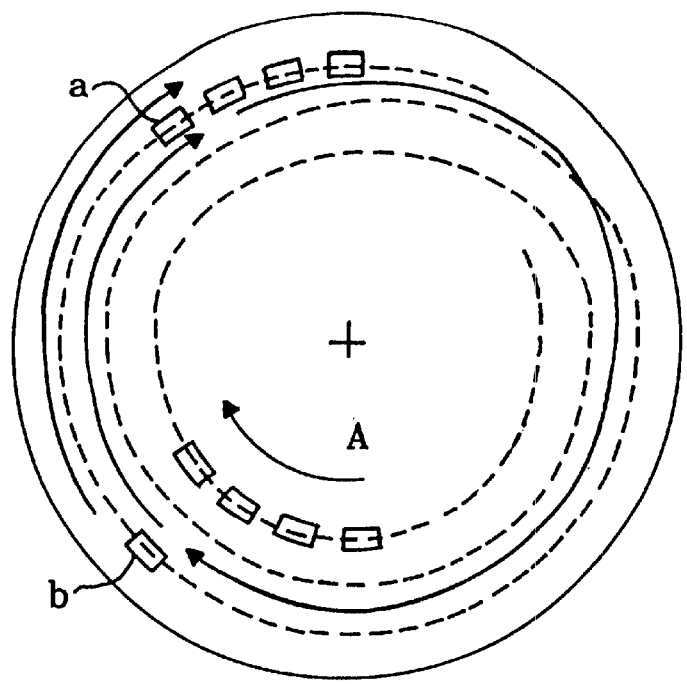
FIG. 9 is a diagram showing positioning of the head during a data write operation.

Write processing in a device according to the present invention will now be explained with reference to FIGS. 7 and 8. In step (S1), the MPU 34 verifies whether or not a WRITE command has been received. In step (S2), the WRITE command has been received, and the MPU 34 positions the head 33 twenty sectors ahead of the intended WRITE sector a (see FIG. 9).

The magnetization direction of the bias magnet 31 is oriented in step (S3-a) in the erase direction B (FIG. 2). In step (S3-b), the MPU 34 counts start sector identifiers 10 until the target sector a is reached, and erase processing is initiated in step (S3-c). It should be noted that the head cannot read the sector address at this time since the bias magnet 31 is oriented in the erase direction B. However, since the sector identifier 10 is formed as a physical pit, the head can detect (and count) the start of a sector irrespective of the magnetization direction of the bias magnet 31.

In step (S4-a), the magnetization direction of the bias magnet 31 is oriented in the READ/RECORD direction A, the head 33 is once again positioned twenty sectors ahead of the target sector a (S4-b), and the MPU 34 counts start sector identifiers 10 until the target sector is reached (S4-c). Once the target sector is reached, write processing is initiated (S5).

It should be appreciated that the aforementioned erase and write operations were performed by counting down to the target sector, without actually verifying the sector address. Consequently, in steps (S6–S12), a verification process is performed to determine whether the write operation was performed on the intended sector to ensure that the write operation did not inadvertently operate on an adjacent track due to the head 33 being off track.

Figure 10:
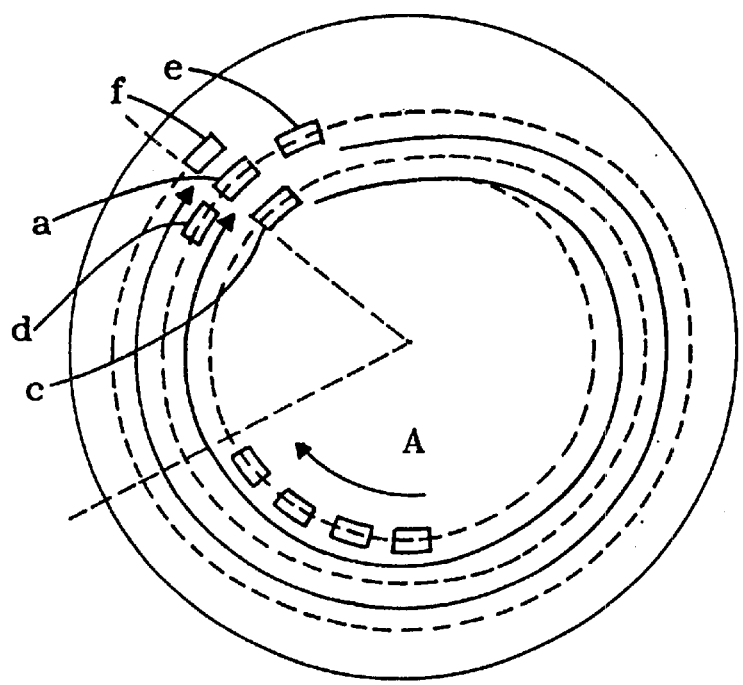
FIG. 10 is a diagram showing positioning of the head during a write verifying action.

The verifying operation begins by positioning the head in sector c on the physical track which immediately precedes the target track (S6). See FIG. 10. In step (S7-a), the head 33 reads from sector c (on the track which physically precedes the target track) until sector d (on the target track) which immediately precedes the target sector a. It should be noted that the tracks shown in FIG. 10 are formed in a spiral manner.

If an error is detected during the reading operation in step (S7-b), then it is likely the head was off track during either the erasing (S3-c) or writing (S5) operations, whereupon the MPU 34 reports a WRITE command abnormal termination 8 to the host and terminates further processing. In step (S8), if no read error is detected, the MPU 34 stores the sector address of sector d. Subsequently, in step (S9-a), the target sector a is read. As was explained above with reference to FIG. 6, the MPU 34 compares the first sector address 16 and the second sector address 18 of the intended sector to determine whether they match (S9-b). If the sector addresses do not match then an off track error has occurred and the MPU 34 reports a write command abnormal termination to the host 5 and terminates further processing.

In step (S10), the head reads from sector e which immediately follows the target sector. Then, in step (S11), the addresses of the sectors immediately preceding (sector d) and immediately following (sector e) are compared with the target address (sector a). If the relationship d<a<e is satisfied then processing continues with step (S12-a). Otherwise, an error is reported to the host 9.

Next, in step (S12-a) a reading operation is performed from sector (e) (on the target track) until sector f (on the track which immediately follows the target track). Again, it should be noted that the tracks shown in FIG. 10 are formed in a spiral manner.

If an error is detected during the reading operation (S12-b), then it is likely that the head 33 was off track during either the erasing (S3-c) or writing (S5) operations, whereupon the MPU 34 signals a write command abnormal termination to the host 9 and terminates further processing. Conversely, if no read error is detected, the MPU 34 posts a WRITE command normal termination to the host 9 and terminates (S13).

In this manner, the MPU 34 can detect errors such as off track erasing and off track writing. Likewise, using the write verify operation (S6–S12), the MPU 34 is able to verify that data has been correctly recorded on the target sector even though it cannot verify sector addresses in real-time. The reading operation in steps S7a through S12b is able to detect off track conditions of the head in a track direction by checking a sector continuity of the sectors d, a, e, and also off track conditions in track traverse direction by checking read error from the sector c to the sector d and from the sector e to the sector f, that is, checking a sector continuity from the sector c to the sector f and whether c<a<f.

Figure 11:
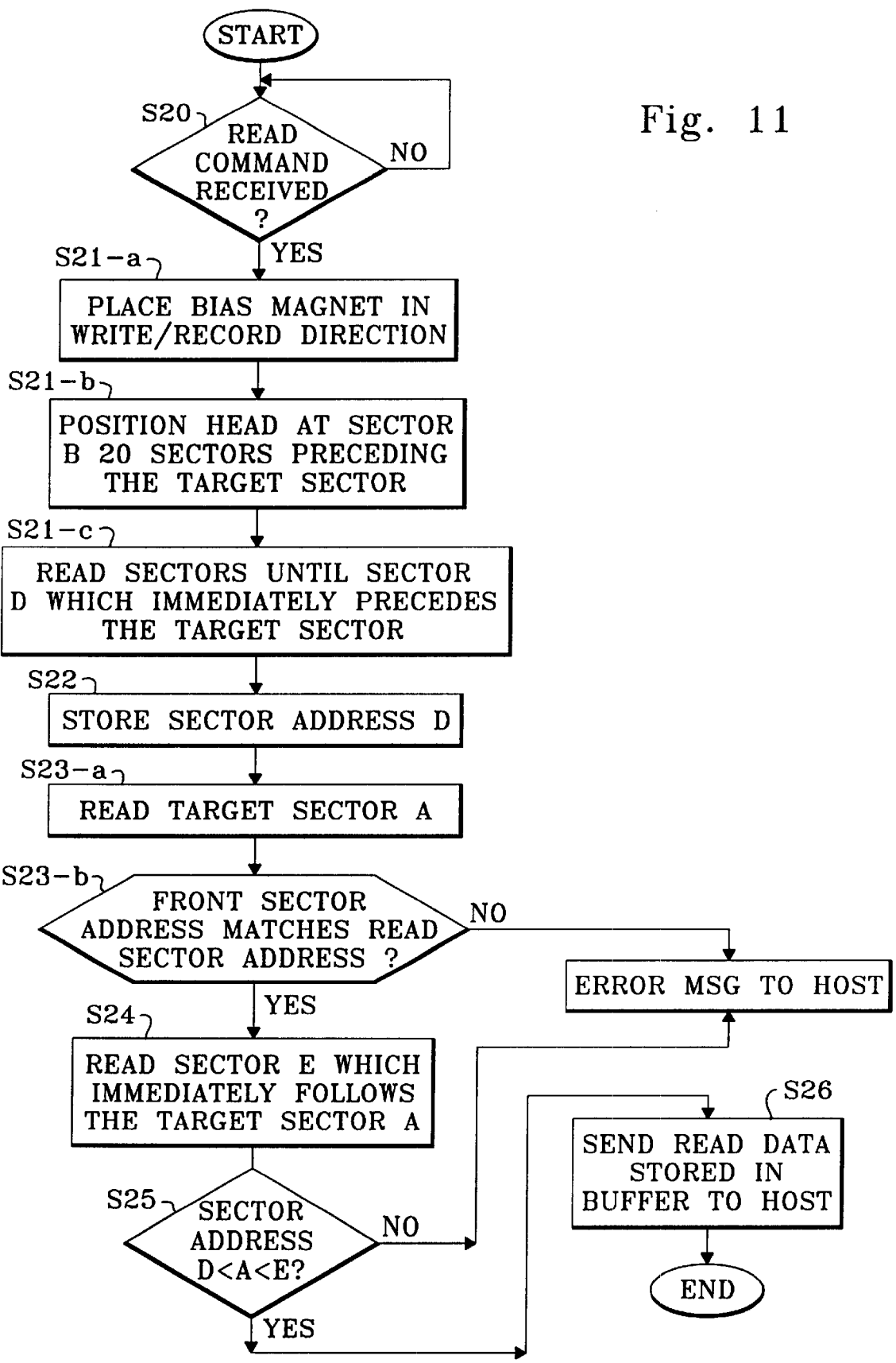
FIG. 11 is a flow diagram showing steps for verifying a write operation by performing a read operation.

Read processing in a device according to the present invention will now be explained with reference to FIG. 11.

The MPU 34 verifies whether or not a READ command has been received (S20). Once the MPU 34 receives a READ command, it positions the bias magnet 31 in the READ direction (S21-a), and positions head 33 at sector b which is twenty sectors ahead of the intended read sector a (S21-b). See FIG. 9.

Next, the MPU 34 counts sector identifiers 10, until it reaches sector d, which immediately precedes the target sector (S21-c), and reads and stores the address of sector d (S22). The target sector a is then read (S23-a). As explained above, with reference to FIG. 6, the MPU 34 compares the first sector address 16 and the second sector address of the intended sector to ascertain whether they match (S23-b). Again, as explained earlier, if the sector addresses do not match then an off track error has occurred, and the MPU 34 reports a READ command abnormal termination to the host 9 and terminates.

The head 33 then reads the sector address of sector e, which immediately follows the target sector a (S24). The MPU then compares the sector address of sector e with the target sector address and the stored address of sector d (S25). If the relationship d<a<e is satisfied then the READ data in data buffer 55 is transmitted to the host 9 and a READ command normal termination is posted to the host (S26). Otherwise, an error has likely occurred during writing processing, and a READ command abnormal termination is reported to the host 9.

Although a preferred embodiment of the storage medium has been specifically described and illustrated, it is to be understood that variations or alternative embodiments apparent to those skilled in the art are within the scope of this invention. Since many such variations may be made, it is to be understood that within the scope of the following claims, this invention may be practiced otherwise than specifically described.

What is claimed is:

1. A storage medium for storing information on a plurality of tracks formed thereon, each of the tracks being divided into a plurality of sectors, said optical storage medium comprising:

a physically formed sector beginning identifier provided at a leading portion of each said sector; and an information storing portion including:
at least one sector address portion provided at a leading end of said information storing portion and storing a sector address, and
a data portion provided after said sector address portion and storing user data.

2. A storage medium according to claim 1, wherein said sector address is written into said sector address portion with at least one of an optical beam and a magnetic field.

3. A storage medium according to claim 1, wherein said sector address is read using MSR techniques.

4. A storage medium according to claim 1, wherein said information storing portion includes a first sector address portion provided in front of said data portion and a second sector address portion provided in back of said data portion.

5. A storage medium according to claim 1, wherein said information storing portion includes an error correction code (ECC) portion which stores error correction codes used to correct errors in said sector address and said user data.

* * * * *